United States Patent
De Iuliis et al.

(10) Patent No.: US 8,674,558 B2
(45) Date of Patent: Mar. 18, 2014

(54) POWER ADAPTERS FOR POWERING AND/OR CHARGING PERIPHERAL DEVICES

(75) Inventors: Daniele De Iuliis, San Francisco, CA (US); Andrew Bert Hodge, Menlo Park, CA (US); Jeffrey L. Robbin, Los Altos, CA (US); Stanley Carl Ng, Campbell, CA (US); Eric W. Anderson, Cupertino, CA (US); Anthony M. Fadell, Portola Valley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/549,286

(22) Filed: Jul. 13, 2012

(65) Prior Publication Data

US 2012/0275206 A1 Nov. 1, 2012

Related U.S. Application Data

(60) Continuation of application No. 12/838,397, filed on Jul. 16, 2010, now Pat. No. 8,222,773, which is a division of application No. 11/698,405, filed on Jan. 26, 2007, now Pat. No. 7,766,698, which is a continuation of application No. 10/125,893, filed on Apr. 18, 2002, now abandoned.

(60) Provisional application No. 60/345,252, filed on Oct. 22, 2001.

(51) Int. Cl.
*H02J 7/00* (2006.01)
(52) U.S. Cl.
USPC .......................................................... 307/150
(58) Field of Classification Search
USPC ................................................ 307/150, 151
See application file for complete search history.

(56) References Cited

U.S. PATENT DOCUMENTS

| | | | |
|---|---|---|---|
| 2,724,869 A | 11/1955 | Merrill et al. | |
| 2,743,507 A | 5/1956 | Kornei | |
| 3,444,440 A | 5/1969 | Bell et al. | |
| 3,474,185 A | 10/1969 | Ahearn et al. | |
| 3,806,766 A | 4/1974 | Fanning | |
| 3,838,316 A | 9/1974 | Brown et al. | |
| RE28,489 E | 7/1975 | Schindler et al. | |
| 4,092,580 A | 5/1978 | Prinsze | |
| 4,409,536 A * | 10/1983 | Evjen | 320/110 |

(Continued)

FOREIGN PATENT DOCUMENTS

| | | |
|---|---|---|
| JP | 2001-069165 A | 3/2001 |
| WO | 99/26330 A2 | 5/1999 |
| WO | 00/39907 A2 | 7/2000 |
| WO | 03/073688 A1 | 9/2003 |

OTHER PUBLICATIONS

Adder Technology Ltd., ADDERView USB Installation & Use Manual, Nov. 1999. (31 pages).

(Continued)

*Primary Examiner* — Daniel Cavallari
(74) *Attorney, Agent, or Firm* — Kilpatrick Townsend & Stockton LLP

(57) ABSTRACT

A power adapter for a peripheral device such as portable electronics device is disclosed. The power adapter includes a housing that contains electrical components associated with the power adapter. The power adapter also includes a data port provided at a surface of the housing. The data port is configured to provide external power to the peripheral device.

21 Claims, 8 Drawing Sheets

(56) References Cited

U.S. PATENT DOCUMENTS

| | | |
|---|---|---|
| 4,642,419 A | 2/1987 | Meddles |
| 4,673,861 A | 6/1987 | Dubovsky et al. |
| 4,965,738 A | 10/1990 | Bauer et al. |
| 5,090,919 A | 2/1992 | Tsuji |
| 5,103,156 A | 4/1992 | Jones et al. |
| 5,150,031 A | 9/1992 | James et al. |
| 5,164,609 A | 11/1992 | Poppe et al. |
| 5,223,811 A | 6/1993 | Hendel |
| 5,292,256 A | 3/1994 | Brunker |
| 5,371,456 A | 12/1994 | Brainard |
| 5,394,298 A | 2/1995 | Sagisaka |
| 5,402,055 A | 3/1995 | Nguyen |
| 5,471,128 A | 11/1995 | Patino et al. |
| 5,498,950 A | 3/1996 | Ouwerkerk |
| 5,514,945 A | 5/1996 | Jones |
| D371,110 S | 6/1996 | Harris et al. |
| 5,573,425 A | 11/1996 | Morisawa |
| 5,602,455 A | 2/1997 | Stephens et al. |
| 5,613,863 A * | 3/1997 | Klaus et al. ............... 439/131 |
| 5,616,039 A | 4/1997 | Morley |
| 5,648,712 A | 7/1997 | Hahn |
| 5,675,813 A | 10/1997 | Holmdahl |
| 5,735,711 A | 4/1998 | Fremgen |
| 5,744,934 A | 4/1998 | Wu |
| 5,754,027 A | 5/1998 | Oglesbee et al. |
| 5,786,985 A | 7/1998 | Taniguchi et al. |
| 5,845,217 A | 12/1998 | Lindell et al. |
| 5,847,545 A * | 12/1998 | Chen et al. ............... 320/138 |
| 5,901,056 A | 5/1999 | Hung |
| 5,955,869 A | 9/1999 | Rathmann |
| 5,973,948 A | 10/1999 | Hahn et al. |
| 5,995,374 A | 11/1999 | Suzuki et al. |
| 6,000,042 A | 12/1999 | Henrie |
| 6,007,372 A | 12/1999 | Wood |
| 6,025,695 A | 2/2000 | Friel et al. |
| 6,051,783 A | 4/2000 | Dreyer et al. |
| 6,062,880 A | 5/2000 | Skuza |
| 6,086,395 A * | 7/2000 | Lloyd et al. ............... 439/172 |
| 6,087,804 A | 7/2000 | Suda |
| 6,111,199 A | 8/2000 | Wyland et al. |
| 6,111,772 A | 8/2000 | Lee |
| 6,125,455 A | 9/2000 | Yeo |
| 6,130,518 A | 10/2000 | Gabehart et al. |
| 6,152,778 A * | 11/2000 | Dalton ............... 439/638 |
| 6,169,387 B1 | 1/2001 | Kaib |
| 6,178,514 B1 | 1/2001 | Wood |
| 6,184,652 B1 | 2/2001 | Yang |
| 6,184,655 B1 | 2/2001 | Malackowski |
| 6,204,637 B1 | 3/2001 | Rengan |
| 6,211,581 B1 | 4/2001 | Farrant |
| 6,211,649 B1 | 4/2001 | Matsuda |
| 6,252,380 B1 | 6/2001 | Koenck |
| 6,261,109 B1 | 7/2001 | Liu et al. |
| 6,271,605 B1 | 8/2001 | Carkner et al. |
| 6,283,789 B1 | 9/2001 | Tsai |
| 6,285,541 B1 | 9/2001 | Osaki et al. |
| 6,316,916 B2 | 11/2001 | Bohne |
| D453,142 S | 1/2002 | Watanabe et al. |
| 6,353,894 B1 | 3/2002 | Pione |
| 6,357,011 B2 | 3/2002 | Gilbert |
| 6,362,610 B1 | 3/2002 | Yang |
| 6,363,491 B1 | 3/2002 | Endo |
| 6,392,414 B2 | 5/2002 | Bertness |
| 6,489,751 B2 | 12/2002 | Small et al. |
| 6,526,516 B1 | 2/2003 | Ishikawa |
| 6,531,845 B2 | 3/2003 | Kerai et al. |
| 6,535,983 B1 | 3/2003 | McCormack et al. |
| 6,545,583 B1 | 4/2003 | Palmer |
| 6,548,755 B2 | 4/2003 | Wu |
| 6,601,179 B1 | 7/2003 | Jackson et al. |
| D478,310 S | 8/2003 | Andre et al. |
| 6,614,232 B1 | 9/2003 | Mukai |
| 6,633,932 B1 | 10/2003 | Bork et al. |
| 6,664,758 B2 | 12/2003 | Yang |
| 6,747,859 B2 | 6/2004 | Walbeck et al. |
| 6,774,604 B2 | 8/2004 | Matsuda et al. |
| 6,799,226 B1 | 9/2004 | Robbin et al. |
| 6,812,553 B2 | 11/2004 | Gerbsch et al. |
| 6,935,412 B2 | 8/2005 | Mueller |
| 6,936,936 B2 | 8/2005 | Fischer et al. |
| 6,969,970 B2 | 11/2005 | Dias et al. |
| 6,980,204 B1 | 12/2005 | Hawkins et al. |
| 7,002,807 B2 | 2/2006 | Takabatake et al. |
| 7,151,950 B1 | 12/2006 | Oyang et al. |
| 7,156,689 B2 | 1/2007 | Fabian et al. |
| 7,157,648 B2 | 1/2007 | Park |
| 7,212,420 B2 | 5/2007 | Liao |
| 7,354,286 B1 | 4/2008 | Lee |
| 7,365,959 B1 | 4/2008 | Ward |
| 7,413,446 B1 | 8/2008 | Jilg et al. |
| 7,530,861 B2 | 5/2009 | Nakamura |
| 7,573,159 B1 | 8/2009 | DeIuliis et al. |
| 7,591,074 B1 | 9/2009 | Potts et al. |
| 7,697,300 B2 | 4/2010 | Brandt et al. |
| 7,766,698 B1 | 8/2010 | DeIuliis et al. |
| 8,222,773 B2 | 7/2012 | DeIuliis et al. |
| 8,232,672 B2 | 7/2012 | DeIuliis et al. |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0005834 A1 | 1/2002 | Oh |
| 2002/0055288 A1 | 5/2002 | Philips et al. |
| 2002/0077073 A1 | 6/2002 | Smith |
| 2002/0105861 A1 | 8/2002 | Leapman |
| 2002/0127918 A1 | 9/2002 | Kajiwara et al. |
| 2002/0156949 A1 | 10/2002 | Kubo et al. |
| 2002/0174387 A1 | 11/2002 | Lohoff et al. |
| 2002/0195993 A1 | 12/2002 | Chiu |
| 2003/0011702 A1 | 1/2003 | Ohmura et al. |
| 2003/0048096 A1 | 3/2003 | Liu et al. |
| 2003/0110403 A1 | 6/2003 | Crutchfield et al. |
| 2003/0133263 A1 | 7/2003 | Shu |
| 2003/0175090 A1 | 9/2003 | Port-Robach |
| 2004/0084948 A1 | 5/2004 | Glynn et al. |
| 2004/0204177 A1 | 10/2004 | Pon |
| 2004/0224638 A1 | 11/2004 | Fadell et al. |
| 2004/0225804 A1 | 11/2004 | Leete |
| 2005/0017645 A1 | 1/2005 | Wahlin |
| 2005/0082081 A1 | 4/2005 | Marcou et al. |
| 2005/0258244 A1 | 11/2005 | Mitchell et al. |
| 2007/0054550 A1 | 3/2007 | Cuthbert et al. |
| 2007/0091656 A1 | 4/2007 | Navid et al. |
| 2007/0105424 A1 | 5/2007 | Portwood |
| 2007/0106760 A1 | 5/2007 | Houh et al. |
| 2007/0126290 A1 | 6/2007 | Jaynes et al. |
| 2007/0217242 A1 | 9/2007 | Dayan et al. |
| 2007/0238341 A1 | 10/2007 | So |
| 2007/0238350 A1 | 10/2007 | Azoulay |
| 2008/0064252 A1 | 3/2008 | Nakamura |
| 2008/0233803 A1 | 9/2008 | Renteria et al. |
| 2009/0258521 A1 | 10/2009 | Ooki |
| 2010/0086125 A1 | 4/2010 | Denter et al. |
| 2010/0277007 A1 | 11/2010 | DeIuliis et al. |
| 2010/0312140 A1 | 12/2010 | Smith et al. |
| 2011/0225812 A1 | 9/2011 | DeIuliis et al. |
| 2012/0274155 A1 | 11/2012 | DeIuliis et al. |
| 2013/0081845 A1 | 4/2013 | Siahaan et al. |

OTHER PUBLICATIONS

"A Serial Bus on Speed Diagram: Getting Connected with FireWire," downloaded Oct. 16, 2001, PC Magazine: PC Tech (A Serial Bus on Speed) wysiwyg://51http://www.zdnetcom/pctech/content/18/10/tu1810.007.html p. 7. (2 pages).

Belkin iPod Voice Recorder, Product Specification Sheet, printed Jun. 16, 2004. (2 pages).

Brentrup, "Introduction to Public Key Cryptography Demystified," Campus Technology, printed from http://www.campus-technology.com/article.asp?id=7626 on Oct. 6, 2004. (5 pages).

Brown, "Making USB Work," downloaded Oct. 16, 2001, PC Magazine: PC Tech wysiwyg:/155/http://www.zdnet.com/pcmag/pctech/content!18/04/tu1804.001.html (2 page).

"Cables to Go," download Oct. 16, 2001 http://www.cablestogo.com/product.asp?cat%5Fid=601&sku=27028 (1 page).

(56) References Cited

OTHER PUBLICATIONS

"ExpressBus™ F5U0I0," User Guide Packing Checklist, Belkin Components Product Warranty. (2 pages).

"FireWire", downloaded Oct. 16, 2001; wysiwyg://42/http://developer.apple.com/hardware/FireWire (2 pages).

"Fire Wire Connector," downloaded Oct. 16, 2001, wysiwyg://76/ http://developer.apple.com/...es/Macintosh_CPUs-G3/ibook/ibook-27.html. (2 pages).

Fried, "FireWire poised to become ubiquitous," downloaded Oct. 16, 2001, CNET News.com, 1394 Trade Association: Press, wysiwyg:/ 132/http://_113_94ta.org/Press/200_1Press/august!8.2 7._b.html (5 pages).

Fried, "New Fire Wire to blaze faster trail," downloaded Oct. 16, 2001, CNET News.com, http://news.cnet.com/news/0-I006-200-6021210.html. (5 pages).

"How to Connect Your Computer PC Hardware", downloaded Oct. 16, 2001, http:///www.scar.utoronto.ca!~ccweb/faculty/connect-howto.html (5 pages).

"IEEE 1394/USB Comparison," downloaded Oct. 16, 2001, www.genitech.com.aulLIBRARY/TechSupportiinfobits/firewirevsusb.html (4 pages).

"Introduction to Public Key Cryptography," Oct. 9, 1998, printed from http://developer.netscape.com/docs/manuals/security/pkin/contents.html on Oct. 6, 2004. (21 pages).

Lynn, Universal Serial Bus (USB) Power Management, IEEE, 1997, pp. 434-441. (8 pages).

Menezes et al., "Handbook of Applied Cryptography," *Identification and Entity Authentication*, Jan. 1, 1997, pp. 385-424. (41 pages).

Networking Tech Note, "1394 Standards and Specifications," 3 pgs.

"PMC FW2 IEEE1394 FireWire Controller", downloaded Oct. 16, 2001, http://www.bvmltd.co.uk/PMCfw2ds.html (10 pages).

Severance, "FireWire Finally Comes Home," Michigan State University, Standards, Nov. 1998, pp. 117-118 (2 pages).

Teener, "Understanding Fire Wire: The IEEE 1394 Standards and Specifications," downloaded Oct. 16, 2001, wysiwyg:119/http:1_ lwww.chipcenter.com/networking/ieee1394/main.html (5 pages).

Vitaliano, "Why FireWire is Hot!Hot!Hot!" downloaded Oct. 16, 2001, "Impact.FireWire.SideBar" http://www.vxm.com/21R.35.html (4 pages).

Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm, (7 pages).

Non-Final Office Action for U.S. Appl. No. 10/125,893, mailed Nov. 3, 2004, 11 pages.

Final Office Action for U.S. Appl. No. 10/125,893, mailed May 17, 2005, 11 pages.

Non-Final Office Action for U.S. Appl. No. 10/125,893, mailed Aug. 5, 2005, 11 pages.

Non-Final Office Action for U.S. Appl. No. 10/125,893, mailed Dec. 14, 2005, 10 pages.

Final Office Action for U.S. Appl. No. 10/125,893, mailed Jun. 5, 2006, 17 pages.

Non-Final Office Action for U.S. Appl. No. 10/125,893, mailed Mar. 13, 2007, 26 pages.

Final Office Action for U.S. Appl. No. 10/125,893, mailed Nov. 13, 2007, 14 pages.

Non-Final Office Action for U.S. Appl. No. 10/125,893, mailed Sep. 17, 2008, 17 pages.

Non-Final Office Action for U.S. Appl. No. 10/125,893, mailed Apr. 27, 2009, 16 pages.

Non-Final Office Action for U.S. Appl. No. 11/698,405, mailed May 27, 2008, 15 pages.

Final Office Action for U.S. Appl. No. 11/698,405, mailed Mar. 5, 2009, 18 pages.

Non-Final Office Action for U.S. Appl. No. 11/698,405, mailed Sep. 3, 2009, 23 pages.

Notice of Allowance for U.S. Appl. No. 11/698,405, mailed Apr. 7, 2010, 20 pages.

Non-Final Office Action for U.S. Appl. No. 11/076,617, mailed Sep. 6, 2006, 5 pages.

Final Office Action for U.S. Appl. No. 11/076,617, mailed Apr. 10, 2007, 8 pages.

Non-Final Office Action for U.S. Appl. No. 11/076,617, mailed Feb. 19, 2008, 9 pages.

Final Office Action for U.S. Appl. No. 11/076,617, mailed Oct. 29, 2008, 8 pages.

Notice of Allowance for U.S. Appl. No. 11/076,617, mailed Apr. 1, 2009, 6 pages.

Notice of Allowance for U.S. Appl. No. 12/838,397, mailed May 29, 2012, 8 pages.

Notice of Allowance for U.S. Appl. No. 13/151,152, mailed Feb. 23, 2012, 18 pages.

Non-Final Office Action for U.S. Appl. No. 13/549,192 mailed Jan. 7, 2013, 16 pages.

Final Office Action for U.S. Appl. No. 13/549,192 mailed Nov. 7, 2013, 13 pages.

Non-Final Office Action from U.S. Appl. No. 11/698,405 dated Sep. 3, 2009, 25 pages.

Notice of Allowance from U.S. Appl. No. 11/698,405 dated Apr. 7, 2010, 7 pages.

Final Office Action from U.S. Appl. No. 11/076,617 dated Oct. 29, 2008, 9 pages.

Non-Final Office Action dated Jul. 14, 2011 for U.S. Appl. No. 12/838,397, 18 pages.

Non-Final Office Action dated Oct. 26, 2011 for U.S. Appl. No. 12/838,397, 16 pages.

Final Office Action dated Feb. 2, 2012 for U.S. Appl. No. 12/838,397, 11 pages.

Notice of Allowance dated May 29, 2012 for U.S. Appl. No. 12/838,397, 7 pages.

Notice of Allowance dated Feb. 23, 2012 for U.S. Appl. No. 13/151,152, 17 pages.

Non-Final Office Action for U.S. Appl. No. 13/250,652 mailed Sep. 23, 2013, 19 pages.

* cited by examiner

POWER ADAPTERS FOR POWERING AND/OR CHARGING PERIPHERAL DEVICES

CROSS-REFERENCES TO RELATED APPLICATIONS

This application is a continuation of U.S. application Ser. No. 12/838,397 entitled "Power Adapters for Powering and/or Charging Peripheral Devices," filed on Jul. 16, 2010 which is a divisional of U.S. patent application Ser. No. 11/698,405 entitled "Power Adapters for Powering and/or Charging Peripheral Devices," filed on Jan. 26, 2007, now U.S. Pat. No. 7,766,698, issued on Aug. 3, 2010, which is a continuation of U.S. patent application Ser. No. 10/125,893 entitled "Power Adapters for Powering and/or Charging Peripheral Devices," filed on Apr. 28, 2002, which claims the benefit of U.S. Provisional Patent Application No. 60/345,252 entitled "Power Adapters for Powering and/or Charging Peripheral Devices," filed on Oct. 22, 2001, which are incorporated herein by reference for all purposes.

BACKGROUND

The present invention relates to apparatus and methods for powering peripheral devices. More particularly, the present invention relates to improved techniques for powering and/or charging peripheral devices through a data transmission line.

FIG. 1 is an exemplary block diagram of an electronics system 10. The electronics system 10 includes a peripheral device 12 and a host device 14, both of which are capable of processing data. The electronics system 10 also includes a data transmission line 16 that operatively couples the peripheral device 12 to the host device 14. The data transmission line 16 allows data to be transmitted between the peripheral device 12 and the host device 14, i.e., data may be uploaded or downloaded between the devices. In most cases, the peripheral and host devices 12 and 14 include data ports 18 and 20, respectively, for receiving the data connectors of the transmission line 16.

The peripheral device 12, host device 14 and transmission line 16 may take many forms. For example, the peripheral device 12 may be a portable device such as a personal computer, personal digital assistant, cellular phone, digital camera, media player, and the like. The host device 14, which may be portable as well, may also be a general purpose computer such as a desktop computer. In addition, the transmission line 16 may be capable of transmitting data via a serial, parallel, PS/2, small computer system interface (SCSI), universal serial bus (USB), network, FireWire port (IEEE 1394-1995), and the like. Although some of these transmission lines include lines for transmitting both data and power, it should be noted that the power flowing through the transmission lines is typically incidental power used in processing data. That is, the power is not used to supply power for normal operation of the devices, as for example powering up or charging batteries in the case of portable devices (e.g., power is not supplied through the data transmission line when operating with power from a battery of external power source).

In order to operate and/or charge the devices 12 and 14, the system typically includes dedicated power cables that connect the respective devices to an external power source. In this exemplary system 10, the peripheral device 12 is connected to an electrical outlet 22 through a dedicated power cable 24 that includes a plug 26 that receives AC current from the electrical outlet 22, a power adapter 28 that turns AC current into DC current, and a connector 30 that distributes the DC current through a power port 32 of the peripheral device 12. As is generally well known, DC current (3 to 12 volts and less than 1 amp of current) is required to operate most electronic devices and to recharge batteries that store DC current. Although not shown in FIG. 1, in some cases the power adapter and plug may be combined into a single unit.

While the system described above works well, it would be desirable to remove the total number of connections made to a peripheral device so as to reduce the number of connectors and cables needed to operate the peripheral device. By reducing the number of connectors and cables, the peripheral size and the cost of the product may be decreased as well as the ease of use of the peripheral device may be improved (less cables to tote around).

SUMMARY

The invention pertains to power adapters that allow a user to power and/or charge a peripheral device such as a portable electronic device without requiring any additional cables or connectors. The invention also pertains to a connection method for powering a peripheral without requiring a host, peripheral or hub to remain powered on. The connection method allows peripherals to operate on buses that do not supply power. The invention is particularly suitable for peripheral devices that utilize IEEE 1394 FireWire technology (e.g., ports, connectors and data transmission lines).

The invention relates, in one embodiment, to a power adapter. The power adapter includes a power connection. The power adapter also includes a data connector assembly electrically coupled to the power connection, the data connector assembly providing at least one combined power and data connection, wherein the power provided by the combined data and power connection is used to operate or charge a peripheral device.

The invention relates, in another embodiment, to a power adapter for a portable electronics device. The power adapter includes a housing that contains electrical components of the power adapter. The power adapter also includes a data port provided at a surface of the housing. The data port facilitates providing external power to the portable electronics device via the data port.

The invention relates, in another embodiment, to a power adapter. The power adapter includes a housing configured to enclose electrical components associated with the power adapter. The power adapter further includes a power plug capable of electrically coupling to a power source and at least a portion of the electrical components. The power adapter also includes a data port positioned within the housing. The data port is configured for receiving a data connector of a data transmission line capable of transmitting both data and power therethrough. The data port is electrically coupled to the power plug so as to provide power through the data transmission line when the data connector of the data transmission line is received by the data port and when the power plug is electrically coupled to the power source.

The invention relates, in another embodiment, to a data processing system. The data processing system includes a host device capable of processing data through a first data connection. The system further includes a peripheral device capable of processing data and receiving power through a second data connection. The power is configured to operate or charge the peripheral device. The system additionally includes a power adapter having a third data connection for providing the power when the power adapter is electrically coupled to a power source. The system also includes a data transmission cable capable of transmitting both power and data therethrough. The data transmission cable is configured to transmit data between the first data connection and the second data connection when the data transmission line is coupled to the host and peripheral devices. The data transmission cable is also configured to transmit the power from the third data connection to the second data connection when the data transmission line is coupled to the peripheral device and the power adapter.

The invention relates, in another embodiment, to a method of powering a computing device. The method includes receiving a first power from a power source via a power connection. The method also includes outputting a second power to the computing device via a data connection.

The invention relates, in another embodiment, to a power adapter. The power adapter includes a connector assembly having a first data connection capable of transmitting data to and from a host device, and a second data connection capable of transmitting data to and from a peripheral device and power to the peripheral device. The power is used to operate or charge the peripheral device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Figure 1:
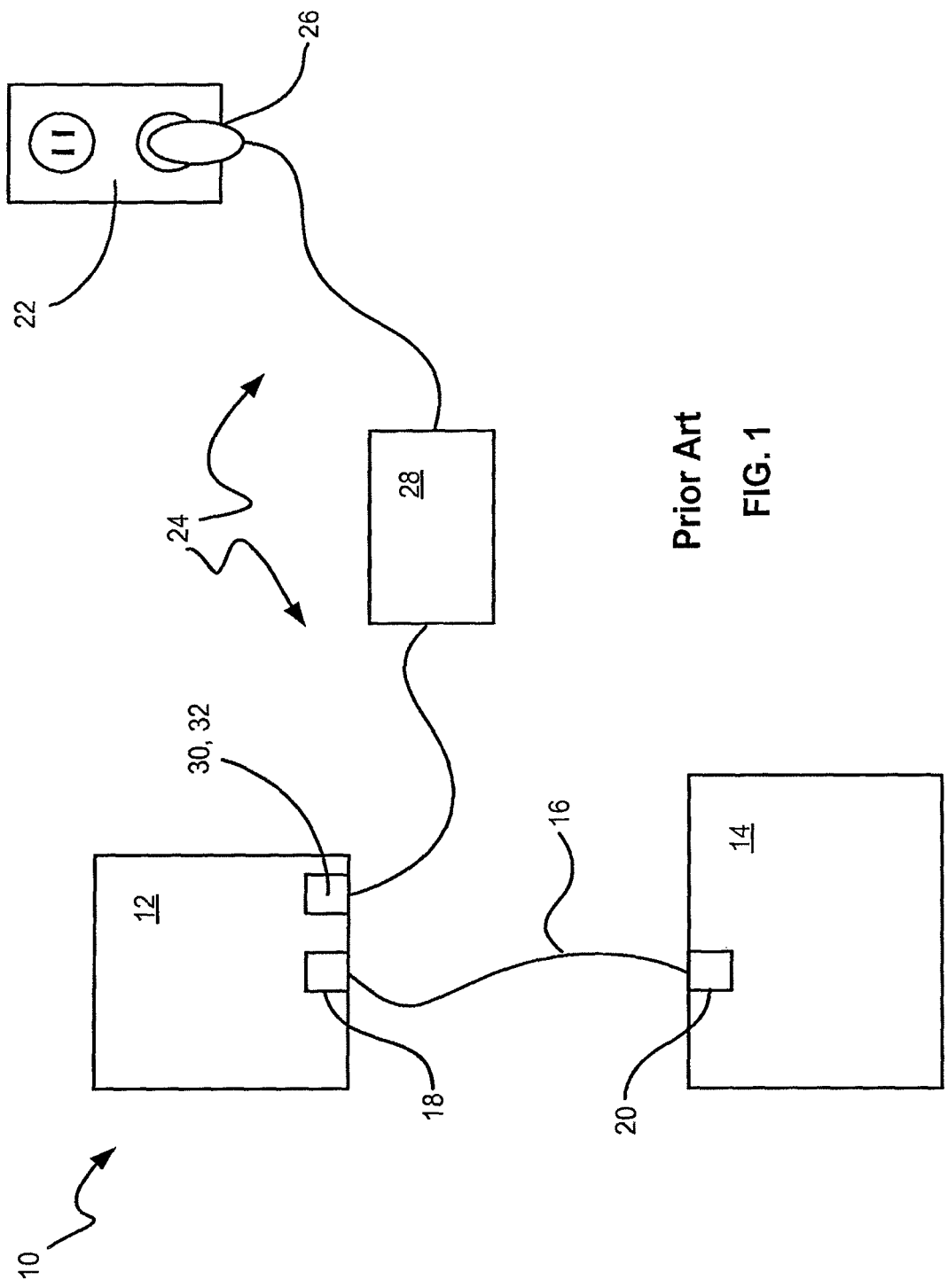
FIG. 1 is an exemplary block diagram of an electronics system.
Figure 2:
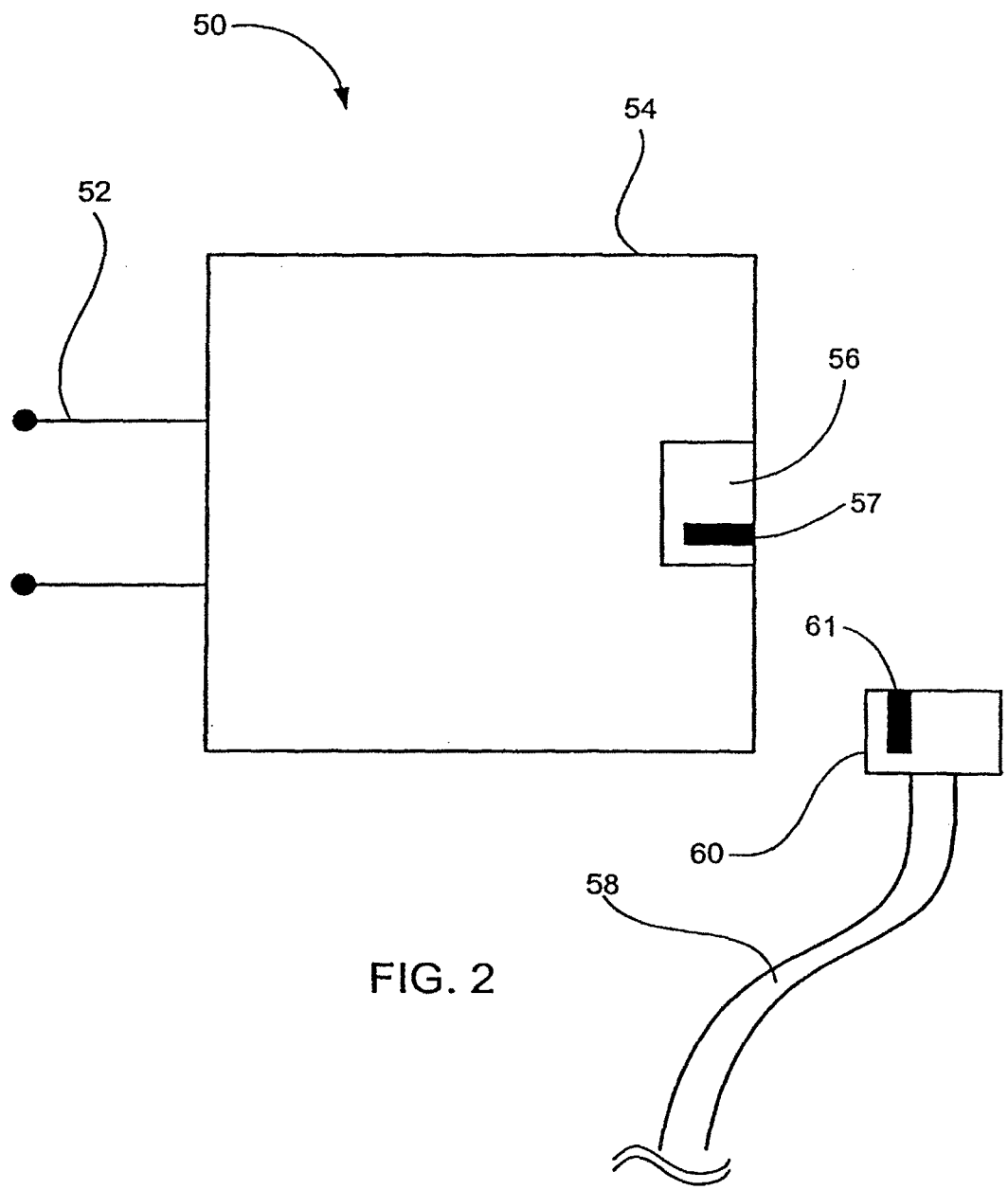
FIG. 2 is a simplified diagram of a power adapter, in accordance with one embodiment of the present invention.

FIG. 2 is a simplified diagram of a power adapter 50, in accordance with one embodiment of the present invention. The power adapter 50 is generally configured to provide power to a peripheral device during operation and/or charging thereof. In one embodiment, the power adapter 50 may be used to provide power to a peripheral device such as a portable electronic device that includes a battery. By way of example, the portable electronic device may be a personal computer, personal digital assistant, cellular phone, digital camera, media player, and the like. In most cases, the power adapter 50 is arranged to receive a first power from a power source and to output a second power to the peripheral device. The second power corresponds to the power needed to operate and/or charge the peripheral device. In some cases, the first power has characteristics that are different than the characteristics of the second power while in other cases the first power has characteristics that are similar to the characteristics of the second power. For example, the first power may provide AC current while the second power may provide DC current. In addition, the first power may provide DC current while the second power may also provide DC current, which may or may not be the same as the source current.

The power adapter 50 generally includes a power connection 52, a housing 54 and a data port 56. The power connection 52 is configured for coupling the power adapter 50 to a power supply (not shown) capable of supplying power to the power adapter 50. The power supply may take on many forms. By way of example, the power supply may be a conventional electrical outlet that supplies AC current, a car lighter outlet that supplies DC current, and/or the like. In the case of the electrical outlet, the power connection 52 typically includes a plug for connection to the electrical outlet. For example, the plug may include several prongs that are insertable into electrically active slots disposed in the electrical outlet. Plugs are generally well known in the art and for the sake of brevity will not be described in detail herein.

The housing 54 is configured to enclose various internal components of the power adapter 50. That is, the housing 54 serves to surround the internal components of the power adapter 50 at a peripheral region thereof so as to cover and protect the internal components from adverse conditions. In most cases, the internal components correspond to electrical components associated with the operation of the power adapter 50. For example, the electrical components may include a transformer for converting electrical power from one voltage-current level to another voltage current level and a rectifier that converts alternating current AC to direct current DC.

The data port 56 is generally provided at the surface of the housing 54. The data port 56, in accordance with one embodiment, is configured to provide external power for operation and charging of a peripheral device such as a portable electronic device. The data port 56 includes at least one power contact 57 that is electrically coupled to the power connection 52. The coupling may be direct or indirect. In the case of indirect, the power contact 57 may be coupled to the power connection 52 through the electrical components of the power adapter 50, as for example, a transformer or rectifier circuit. The data port 56 is arranged to receive one end of a data transmission line 58. The data transmission line 58 is preferably a data transmission line having both data and power transmitting capabilities. As was stated earlier, the power transmitting capabilities are associated with data transmissions. By way of example, the data transmission line 58 may be a universal serial bus (USB) or a FireWire transmission line. The data transmission line 58 typically includes a data connector 60 configured for insertion into the data port 56. The connector 60 includes at least one power contact 61 since the data transmission line 58 has power transmitting capabilities. As should be appreciated, the power contact 61 of the connector 60 is configured to engage the power contact 57 of the data port 56 so as to provide operational or charging power to a peripheral device when the connector 60 is connected to the data port 56.

In one embodiment, the data port is a standard FireWire 6 contact Female connector right angle PCB. In another embodiment, the data transmission line is a standard 6-conductor FireWire cable having a standard FireWire 6 contact male connector at each end. In another embodiment, the data transmission line is a standard 4-conductor FireWire cable having a standard FireWire 6 contact male connector at one end and a compact FireWire 4 contact male connector at the other end.

Figure 3:
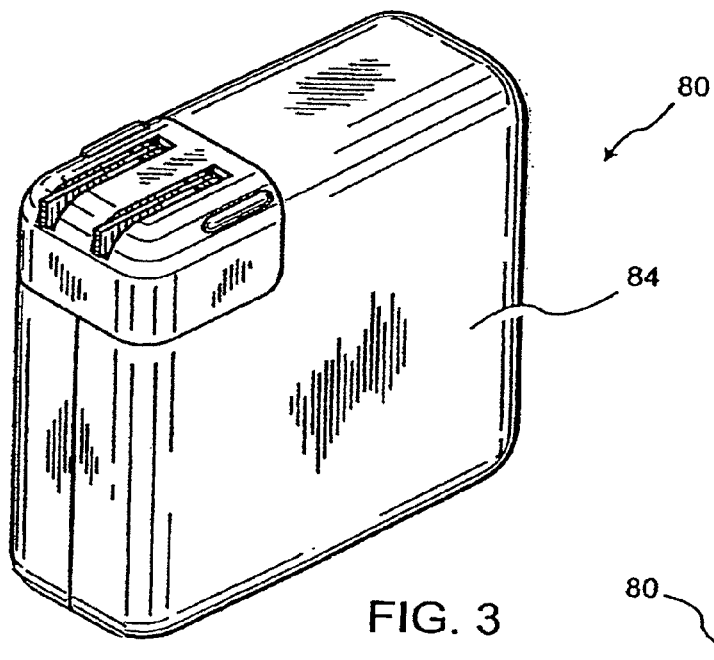
FIG. 3 is a perspective view of a power adapter, in accordance with one embodiment of the present invention.
Figure 4:
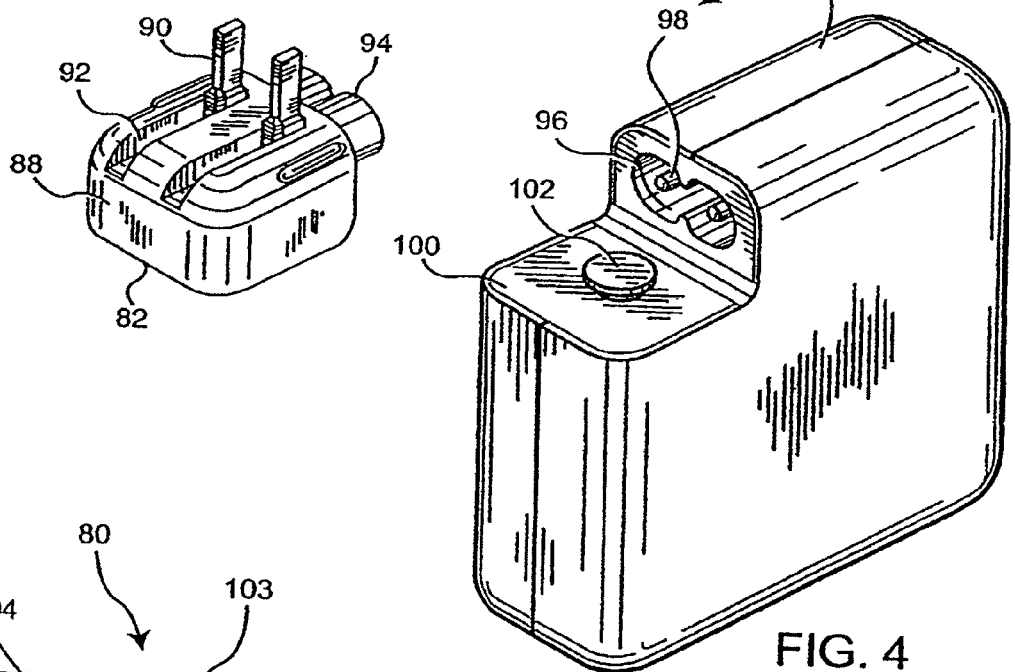
FIG. 4 is a perspective view of a power adapter, in accordance with one embodiment of the present invention.
Figure 5:
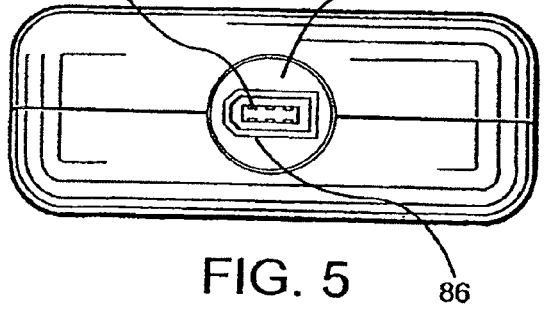
FIG. 5 is a bottom view of a power adapter 80, in accordance with one embodiment of the present invention.

FIGS. 3-5 illustrate a power adapter 80, in accordance with one embodiment of the present invention. FIGS. 3 and 4 are perspective views of the power adapter 80 while FIG. 5 is a bottom view of the power adapter 80. By way of example, the power adapter 80 may generally correspond to the power adapter 50 shown in FIG. 2.

The power adapter 80 includes a plug 82, a housing 84 and a data port 86. The plug 82 may be widely varied. In the illustrated embodiment, the plug 82 corresponds to an AC power plug that is capable of electrically coupling to an AC power source. The plug 82 includes a plug body 88 and a plurality of prongs 90 configured for insertion into slots of a conventional AC electrical outlet. The prongs 90 may be widely varied. For example, the prongs 90 may be adapted to work with various electrical standards including, but not limited to U.S., Japan, UK, France, Italy, Germany, Spain, Sweden, and the like. As is generally well known, the universal worldwide input ranges from about 100V to about 240V.

In one embodiment, the prongs 90 are movable such that they have multiple positions. As shown, the prongs 90 are pivotably coupled to the body 88 such that they may be moved between an extended position (FIG. 3), allowing the prongs 90 to be inserted into an electrical outlet, and a recessed position (FIG. 4), placing the prongs 90 within channels 92 disposed in the body 88 of the plug 82.

In another embodiment, the plug 82 is detachable. This generally gives a user of the power adapter the ability to change the plug from one standard to another. As shown in FIG. 4, the plug 82, and more particularly the body 88, is detached from the housing 84. The detachable plug 82 generally includes a plug connector 94, which extends from the body 88, and which is insertable into a connection opening 96 disposed in the housing 84. Although not shown, the plug connector 94 includes electrical contact surfaces that engage electrical contact pins 98 positioned within the connection opening 96 of the housing 84. The contact surfaces are electrically coupled to the prongs 90 such that electrical current may pass through the prongs 90 to the contact pins 98 when the plug 82 is attached to the housing 84, and more particularly, when the plug connector 94 is inserted into the connection opening 96. The plug 82 and the housing 84 cooperate to form the peripheral surfaces of the power adapter. In the embodiment shown, the plug 82 and housing 84 form flush surfaces when the plug and housing are attached, i.e., the plug is a continuation of the housing.

The housing 84 additionally includes a plug region 100 for receiving the plug 82. In order to securely hold the plug 82 in the plug region 100 of the housing 84, the plug and housing include a holding mechanism. The holding mechanism may be widely varied. In the illustrated embodiment, the holding mechanism includes a notch (not shown), which is disposed on the underside of the body, for engaging a protrusion 102 that extends above a surface of the housing 84.

The housing 84 is configured to enclose various electrical components (not shown) of the power adapter 80. The electrical components are coupled to the power source through the contact pins 98 when the plug 82 is connected to a power source such as a convention AC outlet and when the plug 82 is attached to the housing 84. In one embodiment, at least some of the electrical components are configured to convert the AC power provided to the power adapter 80 by the power source into external power that is coupled to the data port 86. For example, the electrical components may include a transformer for converting electrical power from one voltage-current level to another voltage current level and a rectifier that converts alternating current AC to direct current DC. The external power may be widely varied. For instance, the power adapter may be adapted with different voltage and amperage ratings. In one implementation, the voltage of the external power ranges from about 8 to about 20 volts.

Referring to FIG. 5, the data port 86 is positioned within the housing 84. The data port 86 may be accessed through an opening 103 in the housing 84. The data port 86 generally includes a plurality of contacts 104. Some of the contacts are for transmitting data while others are for transmitting power. With regards to the contacts for transmitting power, the data port may include one or more power contacts that are coupled to the power source through the various components of the power adapter described above so as to provide power to a data transmission line when connected thereto. In the illustrated embodiment, the data port corresponds to a 6 wire Fire Wire port. As is generally well known, the 6 wire FireWire port includes data contacts, a ground contacts and a power contacts. The data contacts are generally paired so as to couple to a pair of twisted data wires of the data transmission line. When transmitting, a first pair of twisted data wires carries data and a second pair of twisted data wires carves clock. When receiving, the reverse is true. It should be noted, however, that the power adapter 80 generally does not use the data contacts of the data port 86 for transmitting data (e.g., they act as dummy contacts). The ground and power contacts, on the other hand, generally couple to separate conducting wires of the data transmission line. The power contact provides power that is capable of being transmitted to a peripheral device through the data transmission line. The power is configured to either operate and/or charge the peripheral device during normal use of the peripheral device. This is different than the conventional use of the data transmission line, which typically provides no power when operating with battery or from a power source. The ground contact provides ground return for the power and inner cable shield of the data transmission line.

An example of a power adapter that may be used is shown in greater detail in a co-pending design patent application entitled, "Power Adapter"; D478546, issued Aug. 19, 2003 filed on even date and incorporated herein by reference.

Figure 6A:
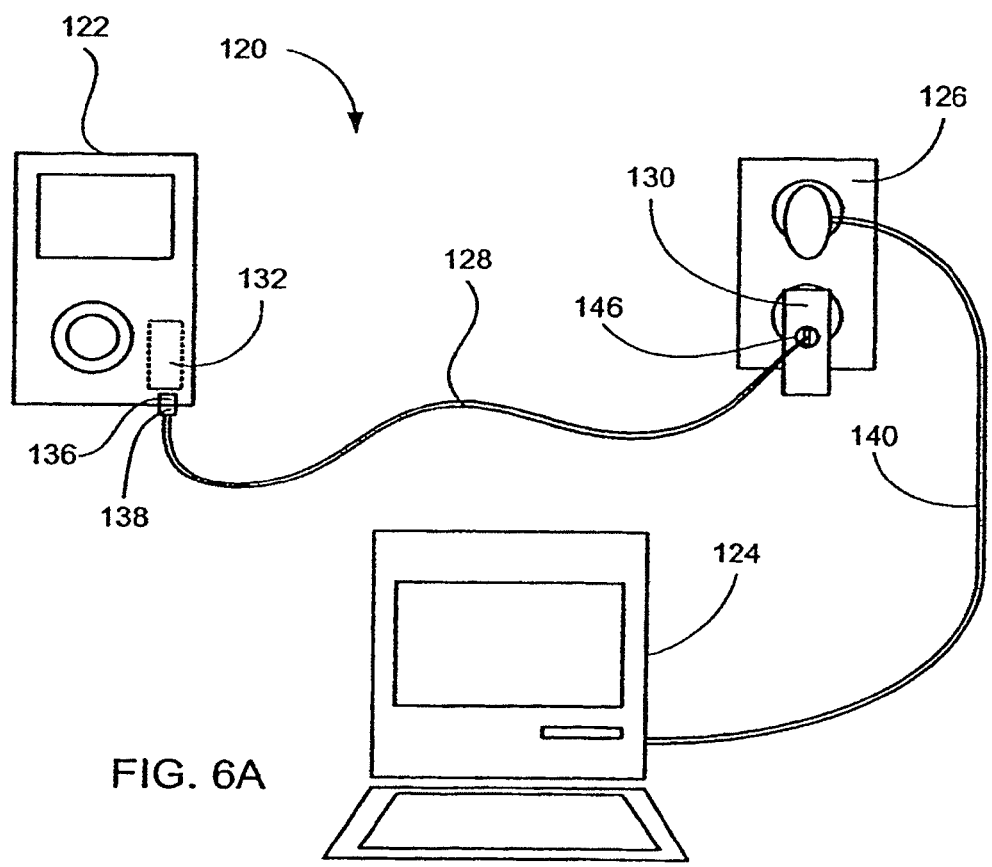
FIGS. 6A and 6B are simplified diagrams of an electronic system, in accordance with one embodiment of the present invention.
Figure 6B:
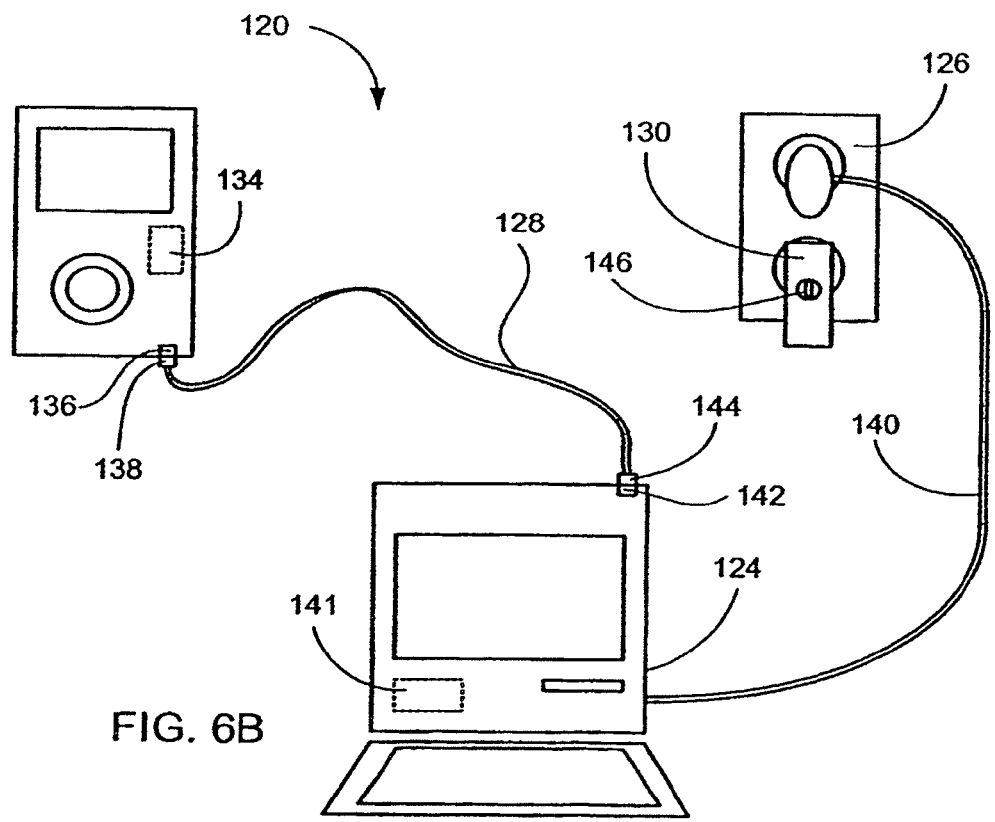

FIGS. 6A and 6B are simplified diagrams of an electronic system 120, in accordance with one embodiment of the present invention. The electronic system 120 includes a peripheral device 122, a host device 124, an external power source 126, a data transmission line 128 and a power adapter 130. The peripheral device 122 generally represents a portable computing device such as a portable computer, personal digital assistant, cellular phone, a media player, and the like. As such, the peripheral device 122 includes a battery 132 that allows the peripheral device 122 to operate without using the external power source 126. The peripheral device 122 also includes internal circuitry 134 for processing data. By way of example, the internal circuitry may correspond to processors, controllers, bridges, memory, buses and the like. The peripheral device 122 also includes a first data port 136 for receiving a first end 138 of the transmission line 128. The first data port 136 is configured to receive both power and data through the data transmission line 128. That is, the first data port 136 includes data contacts that direct data to the internal circuitry for processing, and power contacts that direct power to a power supply used to operate the peripheral device 122 without using power from the battery and to charge the battery when needed. In the illustrated embodiment, the peripheral device 122 is a media player such as an MP3 player or video game player. In the case of the MP3 player, the media player allows a user to store, select and listen to music.

The host device 124, on the other hand, represents any suitable computing device whether portable (e.g., laptop computer) or substantially stationary (e.g., desktop computer). In the illustrated embodiment, the host device 124 is a desktop computer that operates from power supplied by the external power source 126 via a power cable 140. The host device 124 also includes internal circuitry 141 for processing data. By way of example, the internal circuitry may correspond to processors, controllers, bridges, memory, buses and the like. The host device 124 also includes a second data port 142 for receiving a second end 144 of the transmission line 128. The second data port 142 is configured to receive at least data through the data transmission line 128. That is, the second data port 142 includes data contacts that direct data to the internal circuitry 141 for processing. Alternatively, the second data port 142 may also be configured to receive power through the data transmission line, as for example, when the host device is a portable computing device. As shown in FIG. 6B, the data transmission line 128 is connected to both the host and peripheral devices 122 and 124 through the first and second data ports 136, 142. The data transmission line 128 contains electrical wires for carrying data to and from the first and second ports 136, 142 so as to upload or download data. By way of example, in the case of an MP3 player, music files may be uploaded and downloaded to and from the peripheral and host devices.

Referring now to the other components of the system 120, the external power source 126 may be any suitable power source capable of supplying power. In the illustrated embodiment, the external power source 126 is a conventional AC electrical outlet. As shown, the power adapter 130 is electrically connected to the external power source 126. By way of example, the power adapter 130 may generally correspond to any one of the power adapters shown in FIGS. 2-5. As such, the power adapter 130 includes a third data port 146 for receiving the second end 144 of the transmission line 128. The third data port 146 is configured to provide power to the data transmission line 128 when the transmission line is connected thereto. The power that is provided by the third data port 146 is configured for operating and/or charging the peripheral device 122. As shown in FIG. 6A, the data transmission line 128 is connected to both the power adapter 130 and the peripheral device 122 through the first and third data ports 136 and 146. The data transmission line 128 contains electrical wires for carrying the power from the third port 146 to the first port 136 so as to operate and/or charge the peripheral device 122.

Figure 7:
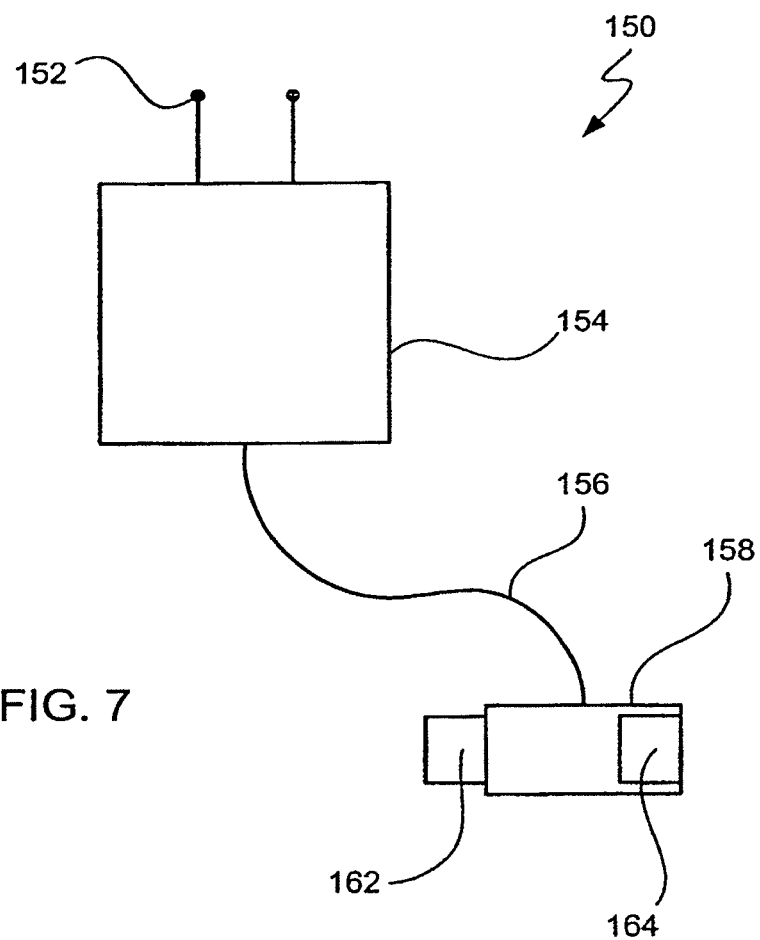
FIG. 7 is a simplified diagram of a power adapter, in accordance with another embodiment of the present invention.

FIG. 7 is a simplified diagram of a power adapter 150, in accordance with another embodiment of the present invention. The power adapter 150 is generally configured to provide power to a peripheral device during operation and/or charging thereof. By way of example, the power adapter 150 may be used to power a portable electronic device such as a personal computer, personal digital assistant, cellular phone, digital camera, media player, and the like. In most cases, the power adapter 150 is arranged to receive a first power from a power source and to output a second power to the peripheral device. The second power corresponds to the power needed to operate and/or charge the peripheral device. In some cases, the first power has characteristics that are different than the characteristics of the second power while in other cases the first power has characteristics that are similar to the characteristics of the second power. For example, the first power may provide AC current while the second power may provide DC current. In addition, the first power may provide DC current while the second power may also provide DC current, which may or may not be the same as the source current.

The power adapter 150 generally includes a power connection 152, a housing 154, a power transmission line 156, and a power-data connector 158. The power connection 152 is configured for coupling the power adapter 150 to a power supply (not shown) capable of supplying power to the power adapter 150. The power supply may take on many forms. By way of example, the power supply may be a conventional electrical outlet that supplies AC current, a car lighter outlet that supplies DC current, and/or the like. In the case of the electrical outlet, the power connection 152 typically includes a plug for connection to the electrical outlet. For example, the plug may include several prongs that are insertable into electrically active slots disposed in the electrical outlet. Plugs are generally well known in the art and for the sake of brevity will not be described in detail herein.

The housing 154 is configured to enclose various internal components of the power adapter 150. That is, the housing 154 serves to surround the internal components of the power adapter 150 at a peripheral region thereof so as to cover and protect the internal components from adverse conditions. In most cases, the internal components correspond to electrical components associated with the operation of the power adapter 150. For example, the electrical components may include a transformer for converting electrical power from one voltage-current level to another voltage current level and a rectifier that converts alternating current AC to direct current DC.

The power transmission line 156 is configured to electrically couple the power connection 152 with the connector assembly 158. The coupling may be direct or indirect. In the case of indirect, the power transmission line 156 may be coupled to the power connection 152 through the electrical components of the power adapter 150, as for example, a transformer or rectifier circuit. In one embodiment, the power transmission line is a high quality 2 conductor wire.

The connector assembly 158 is configured to act as a Y connector for allowing power to be supplied to the peripheral and host device while allowing data to be transmitted between the peripheral and host device. That is, the connector assembly includes a data input/output, a power input, and a combined data input/output and power output. The connector assembly may be widely varied. In most cases, the connector assembly 158 includes a data connector 162 and a data port 164. The data connector 162 is configured for insertion into an external data port and the data port 164 is configured to receive an external data connector. By external, it is meant that the port or connector is not contained within the connector assembly. In most cases, the external data connector is one end of a data transmission line.

Figure 8:
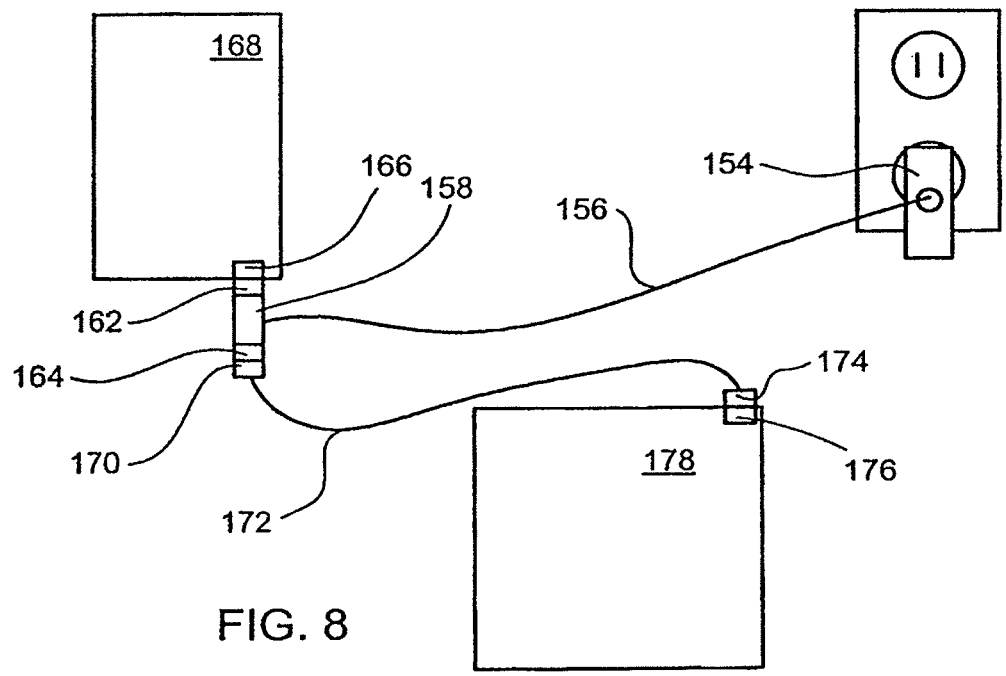
FIG. 8 is a simplified diagram of an electronic system, in accordance with one embodiment of the present invention.

In one embodiment, as shown in FIG. 8, the data connector 162 is configured for insertion into a data port 166 associated with a peripheral device 168. In this embodiment, the data connector 162 is operatively coupled to the data port 164 so as to allow data to pass therebetween and electrically coupled to the power transmission line 156 so as to provide external power for operation and charging of the peripheral device. In particular, the data connector 162 and the data port 164 include data contacts that are coupled together. As such, when a data connector 170 of a data transmission line 172 is connected to the data port 164, data may be carried through the data port 164 to the data connector 162. Essentially, the data connector 162 is an extension of the data transmission line 172 when the data transmission line 172 is connected to the data port 164. That is, the data connector 162 acts like the end of the data transmission line 172. In addition, the data connector 162 includes power contacts that are electrically coupled to the power transmission line 156 and thus the power connection 152. The power contacts are configured to engage a corresponding power contact of the external data port 166 of the peripheral device so as to provide operational or charging power when the data connector 162 is connected to the external data port 166. Moreover, the data transmission line 172 includes a second data connector 174 at its other end for connection to a data port 176 of a host device 178. As such, data may be passed between the host device 178 and the peripheral device 168.

In one implementation of this embodiment, the data ports and data connectors correspond to FireWire connectors and ports. In most cases, the data connector 162 is a 6 wire FireWire connector that includes a pair of paired data contacts, a power contact and a ground contact. The data port 164, on the other hand, may be a 6 wire or 4 wire FireWire port. In general, the power and ground contacts of the data connector 162 are coupled to corresponding wires of the power transmission line, while the pair of paired data contacts are coupled to the corresponding paired data contacts of either the 4 or 6 wire FireWire port. By way of example, the data connector may be a standard FireWire 6-contact male connector right angle PCB and the data port may be a standard FireWire 6-contact female connector right angle PCB.

Figure 9:
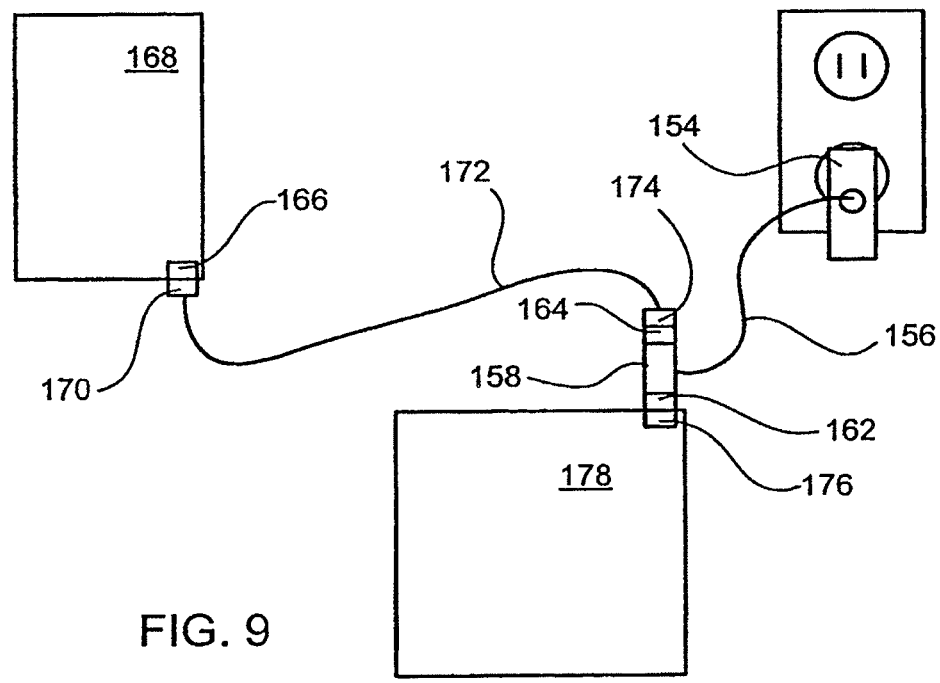
FIG. 9 is a simplified diagram of an electronic system, in accordance with one embodiment of the present invention.

In another embodiment, as shown in FIG. 9, the data connector 162 is configured for insertion into a data port 174 associated with a host device 176. In this embodiment, the data port 164 is operatively coupled to the data connector 162 so as to allow data to pass therebetween and electrically coupled to the power transmission line 156 so as to provide external power for operation and charging of the peripheral device. In particular, the data connector 162 and the data port 164 include data contacts that are coupled together. As such, when the data connector 174 of the data transmission line 172 is connected to the data port 164, data may be carried through the data connector 162 to the data port 164. Essentially, the data port 164 is an extension of the data port 176 when the connector 158 is connected to the host device 178. That is, the data port 164 acts like the data port 176. In addition, the data port 164 includes power contacts that are electrically coupled to the power transmission line 156 and thus the power connection 152. The power contacts are configured to engage a corresponding power contact of the data connector 174 of the data transmission line 170 so as to provide operational or charging power to the peripheral device 168 when the data connector 170 of the data transmission line 172 is connected to the external data port 166 of the peripheral device 168.

In one implementation of this embodiment, the data ports and data connectors correspond to FireWire connectors and ports. In most cases, the data port 164 is a 6 wire FireWire port that includes a pair of paired data contacts, a power contact and a ground contact. The data connector 162, on the other hand, may be a 6 wire or 4 wire FireWire connector. In general, the power and ground contacts of the data port 164 are coupled to corresponding wires of the power transmission line, while the pair of paired data contacts are coupled to the corresponding paired data contacts of either the 4 or 6 wire FireWire connector.

Figure 10:
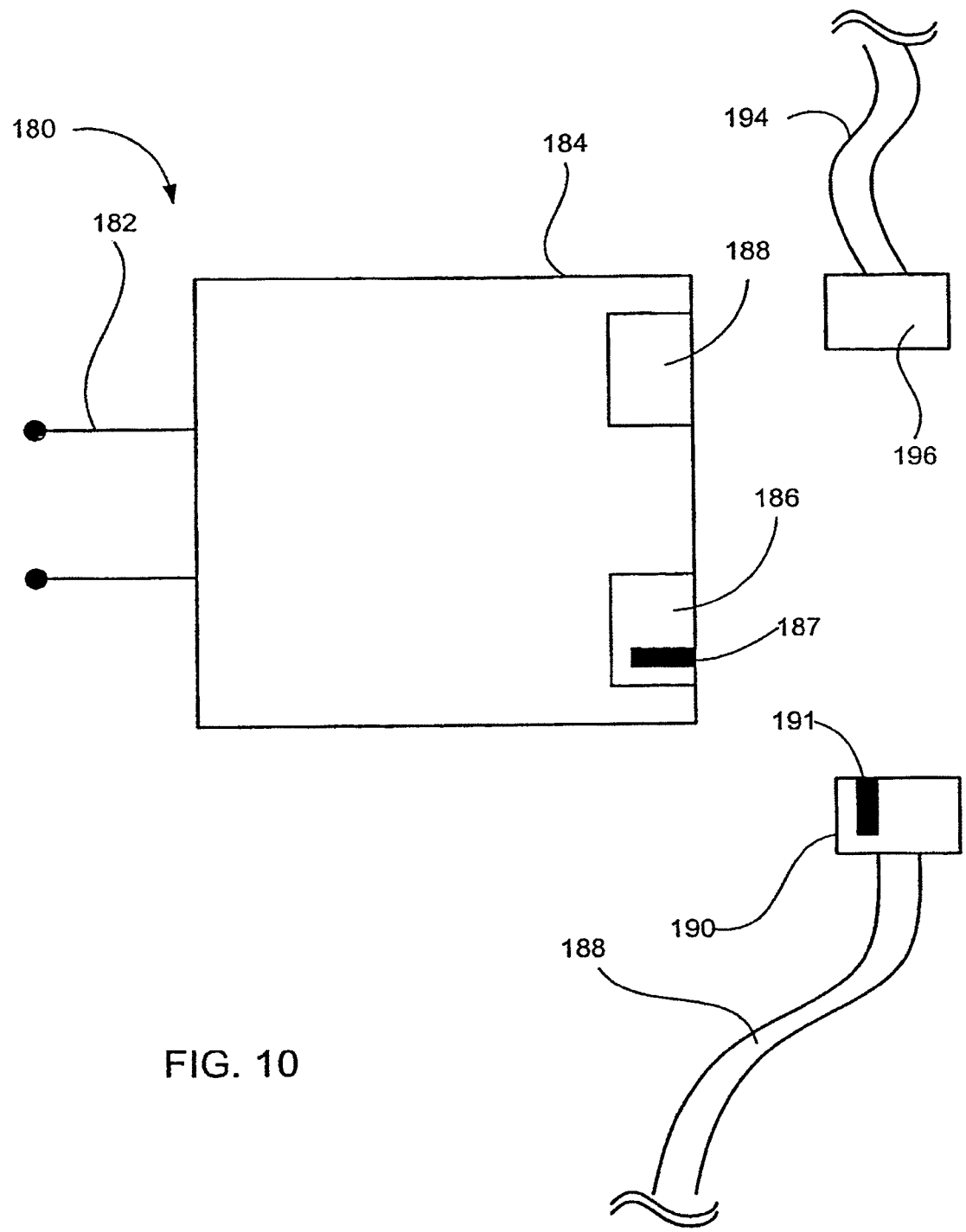
FIG. 10 is a simplified diagram of a power adapter, in accordance with one embodiment of the present invention.

FIG. 10 is a simplified diagram of a power adapter 180, in accordance with one embodiment of the present invention. The power adapter 180 is generally configured to provide power to a peripheral device during operation and/or charging thereof. In one embodiment, the power adapter 180 may be used to provide power to a peripheral device such as a portable electronic device that includes a battery. By way of example, the portable electronic device may be a personal computer, personal digital assistant, cellular phone, digital camera, media player, and the like. In most cases, the power adapter 180 is arranged to receive a first power from a power source and to output a second power to the peripheral device. The second power corresponds to the power needed to operate and/or charge the peripheral device. In some cases, the first power has characteristics that are different than the characteristics of the second power while in other cases the first power has characteristics that are similar to the characteristics of the second power. For example, the first power may provide AC current while the second power may provide DC current. In addition, the first power may provide DC current while the second power may also provide DC current, which may or may not be the same as the source current.

The power adapter 180 generally includes a power connection 182, a housing 184 and a first data port 186 and a second data port 188. The power connection 182 is configured for coupling the power adapter 180 to a power supply (not shown) capable of supplying power to the power adapter 180. The power supply may take on many forms. By way of example, the power supply may be a conventional electrical outlet that supplies AC current, a car lighter outlet that supplies DC current, and/or the like. In the case of the electrical outlet, the power connection 182 typically includes a plug for connection to the electrical outlet. For example, the plug may include several prongs that are insertable into electrically active slots disposed in the electrical outlet. Plugs are generally well known in the art and for the sake of brevity will not be described in detail herein.

The housing 184 is configured to enclose various internal components of the power adapter 180. That is, the housing 184 serves to surround the internal components of the power adapter 180 at a peripheral region thereof so as to cover and protect the internal components from adverse conditions. In most cases, the internal components correspond to electrical components associated with the operation of the power adapter 180. For example, the electrical components may include a transformer for converting electrical power from one voltage-current level to another voltage current level and a rectifier that converts alternating current AC to direct current DC.

The data ports 186, 188 are generally provided at the surface of the housing 184. The data port 186, in accordance with one embodiment, is configured to provide external power for operation and charging of a peripheral device such as a portable electronic device. The data port 186 includes one or more power contacts 187 that is electrically coupled to the power connection 182. The coupling may be direct or indirect. In the case of indirect, the power contact 187 may be coupled to the power connection 182 through the electrical components of the power adapter 180, as for example, a transformer or rectifier circuit. The data port 186 is arranged to receive one end of a first data transmission line 188. The data transmission line 188 is preferably a data transmission line having both data and power transmitting capabilities. As was stated earlier, the power transmitting capabilities are associated with data transmissions. By way of example, the data transmission line 188 may be a universal serial bus (USB) or a FireWire transmission line. The data transmission line 188 typically includes a data connector 190 configured for insertion into the data port 186. The connector 190 includes at least one power contact 191 since the data transmission line 188 has power transmitting capabilities. As should be appreciated, the power contact 191 of the connector 190 is configured to engage the power contact 187 of the data port 186 so as to provide operational or charging power to a peripheral device when the connector 180 is connected to the data port 186.

The second data port 188, on the other hand, is configured to provide a data connection to the first data port 186. That is, the first and second data ports 186, 188 include data contacts that are operatively coupled together. Similar to the first data port 186, the second data port 188 is arranged to receive one end of a second data transmission line 194. As should be appreciated, the data contacts of the ports are arranged to engage corresponding data contacts of the data transmission lines. The second data transmission line 194 may be a data transmission line having only data transmitting capabilities or it may be a data transmission line having both data and power transmitting capabilities. As was stated earlier, the power transmitting capabilities are associated with data transmissions. By way of example, the second data transmission line 194 may be a universal serial bus (USB) or a FireWire transmission line. The second data transmission line 194 typically includes a data connector 196 configured for insertion into the second data port 188. Accordingly, when the first data transmission line is connected to the first data port and the second data transmission line is connected to the second data port, data may be carried through the power adapter between the first and second data transmission lines and thus to and from a peripheral and host device.

Figure 11:
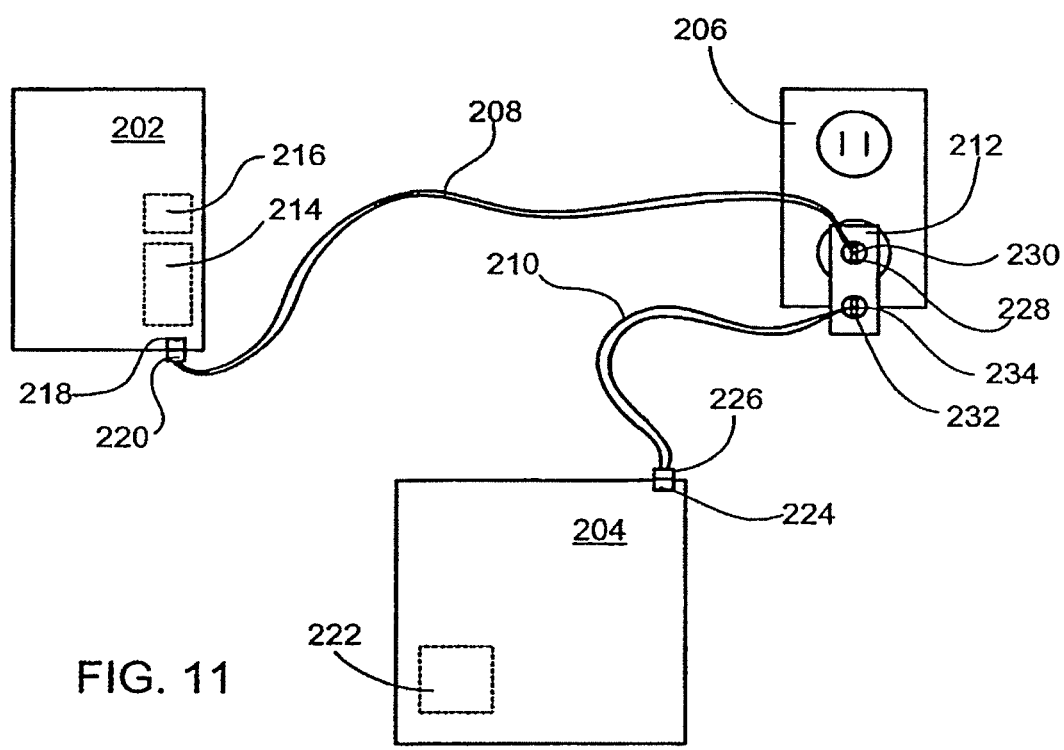
FIG. 11 is simplified diagrams of an electronic system 200, in accordance with one embodiment of the present invention.

FIG. 11 is simplified diagrams of an electronic system 200, in accordance with one embodiment of the present invention. The electronic system 200 includes a peripheral device 202, a host device 204, an external power source 206, a first data transmission line 208, a second data transmission line 210 and a power adapter 212. The peripheral device 202 generally represents a portable computing device such as a portable computer, personal digital assistant, cellular phone, a media player, and the like. As such, the peripheral device 202 includes a battery 214 that allows the peripheral device 202 to operate without using the external power source 206. The peripheral device 202 also includes internal circuitry 216 for processing data. By way of example, the internal circuitry may correspond to processors, controllers, bridges, memory, buses and the like. The peripheral device 202 also includes a first data port 218 for receiving a first end 220 of the first transmission line 208. The first data port 218 is configured to receive both power and data through the first data transmission line 218. That is, the first data port 218 includes data contacts that direct data to the internal circuitry for processing, and power contacts that direct power to a power supply used to operate the peripheral device 202 without using power from the battery and to charge the battery when needed.

The host device 204, on the other hand, represents any suitable computing device whether portable (e.g. laptop computer) or substantially stationary (e.g., desktop computer). The host device 204 also includes internal circuitry 222 for processing data. By way of example, the internal circuitry may correspond to processors, controllers, bridges, memory, buses and the like. The host device 204 also includes a second data port 224 for receiving a first end 226 of the second data transmission line 210. The second data port 224 is configured to transmit and receive at least data through the second data transmission line 210. That is, the second data port 224 includes data contacts that direct data to the internal circuitry 222 for processing. Alternatively, the second data port 224 may also be configured to receive power through the second data transmission line 210, as for example, when the host device is a portable computing device.

Referring now to the other components of the system 200, the external power source 206 may be any suitable power source capable of supplying power. In the illustrated embodiment, the external power source 206 is a conventional AC electrical outlet. As shown, the power adapter 212 is electrically connected to the external power source 206. By way of example, the power adapter 212 may generally correspond to the power adapter shown in FIG. 10. As such, the power adapter 212 includes a third data port 228 for receiving a second end 230 of the first transmission line 208 and a fourth data port 232 for receiving a second end 234 of the second transmission line 210. The third data port 228 is configured to provide power to the first data transmission line 208 when the transmission line is connected thereto. The power that is provided by the third data port 228 is configured for operating and/or charging the peripheral device 202. Both the third and fourth data ports 228, 232 are configured to allow the transfer of data between the first and second transmission lines 208, 210 when the transmission lines are connected thereto. The data transmission line 208, 210 contain electrical wires for carrying data to and from the first and second ports 218, 224 so as to upload or download data with respect to the peripheral and host devices.

While this invention has been described in terms of several preferred embodiments, there are alterations, permutations, and equivalents, which fall within the scope of this invention. It should also be noted that there are many alternative ways of implementing the methods and apparatuses of the present invention. For example, referring to FIG. 6B, the host device may be configured to supply power through the transmission line to the peripheral device. In addition, referring to FIG. 7, the power connector may include a pair of data ports or a pair of data connectors, rather than having one data port and one data connector. Furthermore, referring to FIG. 10, the second data port may be electrically coupled to the power connection so as to provide power to a second peripheral device (which acts as the host device). Moreover, referring to FIG. 11, one or both of the data transmission lines may be permanently attached to the housing. It is therefore intended that the following appended claims be interpreted as including all such alterations, permutations, and equivalents as fall within the true spirit and scope of the present invention.

What is claimed is:

1. A power adapter, comprising:
 a rectangular body having top and bottom faces and four side faces extending between the top and bottom faces, the top and bottom faces being larger than the side faces, the four side faces including a first side face extending between second and third side faces, the third side face extending between a fourth side face and the first side face, the rectangular body having a transformer for converting electrical power housed therein;
 a plug body having spaced-apart prongs capable of extending in a direction perpendicular to the second or the fourth side face and adapted to mate with slots of an electrical outlet, the prongs electrically coupled to the transformer, the plug body removably attached to the rectangular body, the plug body having an exterior surface that extends between the second and fourth side faces of the rectangular body when the plug body is attached to the rectangular body; and
 an electrical connection on one of the four side faces, the electrical connection coupled to the transformer.

2. The power adapter as set forth in claim 1, wherein the spaced-apart prongs pivot between a recessed position substantially within the plug body and an extended position extending outwardly from the plug body.

3. The power adapter as set forth in claim 2, wherein the plug body includes spaced-apart channels for receiving the spaced-apart prongs when in the recessed position.

4. The power adapter as set forth in claim 1, wherein the plug body includes a holding mechanism for mechanically fitting and retaining the plug body on the rectangular body.

5. The power adapter set forth in claim 1 wherein the top face is parallel to the bottom face, wherein the top and bottom faces are substantially flat, wherein the rectangular body includes rounded edges and rounded corners where the top, bottom and side faces meet, and wherein the second side is parallel to the first side.

6. The power adapter as set forth in claim 5, wherein the rounded edges have the same radius of curvature, and wherein the rounded corners have the same radius of curvature.

7. The power adapter as set forth in claim 1, wherein the electrical connection comprises a power transmission line.

8. A power adapter, comprising:
a transformer for converting electrical power;
a housing configured to enclose the transformer, the housing having a plug region, a connection opening, top and bottom faces and four side faces extending between the top and bottom faces, the top and bottom faces being larger than the side faces, the housing having rounded edges and rounded corners where the top, bottom and side faces meet;
a power cable disposed at an exterior surface of the housing;
contact pins positioned within the connection opening and operatively coupled to the transformer;
a detachable plug having a plug body that is received by the plug region of the housing, prongs configured for insertion into slots of an electrical outlet, and a plug connector operatively coupled to the prongs, the plug region positioned on the housing where the top, bottom and two sides faces meet, the plug connector extending from the plug body and including electrical contacts operatively coupled to the prongs, the plug connector being insertable into the connection opening disposed in the housing so as to electrically engage the contact pins and electrical contacts thereby making an operable power connection between the transformer and the prongs; and
a holding mechanism for releasably holding the plug body within the plug region, the holding mechanism including a notch formed of the plug body adapted for slidably engaging a protrusion that extends from a surface of the housing.

9. The power adapter set forth in claim 8 wherein the detachable plug is an AC power plug and the prongs comprise two flat parallel blades adapted for insertion into a standard U.S. AC outlet.

10. The power adapter set forth in claim 8 wherein the detachable plug includes two prongs and the plug body includes two parallel channels exposed at an outer surface of the plug body.

11. The power adapter set forth in claim 10 wherein the prongs are pivotably coupled to the plug body so that they are moveable between an extended position that allows the prongs to be inserted into an electrical outlet and a recessed position in which each of the prongs is positioned within one of the parallel channels.

12. The power adapter set forth in claim 8 wherein, when the detachable plug is attached to the housing, the power adapter has a substantially rectangular shape with rounded corners.

13. The power adapter as set forth in claim 8 wherein, when the detachable plug is attached to the housing, the housing and the detachable plug form flush peripheral surfaces of the power adapter.

14. The power adapter set forth in claim 8 wherein the exterior surface of the housing that the power cable is accessible at is opposite the plug region.

15. A power adapter, comprising:
electrical components configured to convert AC power received by the power adapter into external DC power;
a housing configured to enclose the electrical components, the housing having a plug region, a connection opening, top and bottom faces and four side faces extending between the top and bottom faces, the top and bottom faces being larger than the side faces, the four side faces including a first side face extending between second and third side faces, the third side face extending between a fourth side face and the first side face;
a power cable disposed at a first side of the side faces of the housing;
contact pins positioned within the connection opening and operatively coupled to the electrical components;
a detachable plug having a plug body that is received by the plug region of the housing, prongs configured for insertion into slots of an electrical outlet, and a plug connector operatively coupled to the prongs, the plug connector extending from the plug body and including electrical contacts operatively coupled to the prongs, the plug connector being insertable into the connection opening disposed in the housing so as to electrically engage the contact pins and electrical contacts, thereby making an operable power connection between the electrical components and the prongs; and
a holding mechanism for releasably holding the plug body within the plug region,
wherein the detachable plug includes an exterior surface that extends between the second and fourth side faces of the rectangular body when the plug body is attached to the housing.

16. The power adapter set forth in claim 15 wherein the holding mechanism includes a notch formed of the plug body adapted for slidably engaging a protrusion that extends from a surface of the housing.

17. The power adapter set forth in claim 15 wherein the plug connector is a one-piece integral unit that has a figure eight shaped cross section.

18. The power adapter set forth in claim 17 wherein the plug connector has an outer peripheral surface that generally matches in shape and fits within an interior surface of the connection opening.

19. The power adapter set forth in claim 15 wherein when the detachable plug is attached to the housing, the power adapter has a substantially rectangular shape with rounded corners and the housing and the detachable plug form flush peripheral surfaces of the power adapter, wherein the detachable plug includes two prongs and the plug body includes two parallel channels exposed at the exterior surface of the plug body, and wherein the prongs are pivotably coupled to the plug body so that they are moveable between an extended position that allows the prongs to be inserted into an electrical outlet and a recessed position in which each of the prongs is positioned within one of the parallel channels.

20. The power adapter set forth in claim 19 wherein the prongs in the detachable plug comprise two flat parallel blades.

21. A power adapter, comprising:

a rectangular body having top and bottom surfaces and four side surfaces extending between the top and bottom surfaces, the top and bottom surfaces being larger than the side surfaces, the four side surfaces including a first side surface extending between second and third side surfaces, the third side surface extending between a fourth side surface and the first side surface, the rectangular body carrying an transformer for converting electrical power, the rectangular body including a plug body removably attached to the rectangular body, the plug body including an exterior surface that extends between the second and fourth side surfaces of the rectangular body when the plug body is attached to the rectangular body, the plug body having spaced-apart prongs electrically coupled to the transformer and capable of extending in a direction perpendicular to one of the side surfaces and adapted to mate with slots of an electrical outlet, and the rectangular body including an electrical connection electrically coupled to the transformer and located on one of the side surfaces.

* * * * *